United States Patent
Lee

(10) Patent No.: US 9,966,800 B2
(45) Date of Patent: May 8, 2018

(54) WIRELESS POWER RECEIVING DEVICE

(71) Applicant: LG INNOTEK CO., LTD., Seoul (KR)

(72) Inventor: Ki Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 297 days.

(21) Appl. No.: 15/065,096

(22) Filed: Mar. 9, 2016

(65) Prior Publication Data

US 2017/0126064 A1 May 4, 2017

Related U.S. Application Data

(60) Provisional application No. 62/248,579, filed on Oct. 30, 2015.

(51) Int. Cl.
| | |
|---|---|
| *H02J 50/12* | (2016.01) |
| *H01F 27/36* | (2006.01) |
| *H01F 38/14* | (2006.01) |
| *H02J 7/02* | (2016.01) |
| *H01F 3/10* | (2006.01) |

(52) U.S. Cl.
CPC ............ *H02J 50/12* (2016.02); *H01F 27/362* (2013.01); *H01F 27/365* (2013.01); *H01F 38/14* (2013.01); *H02J 7/025* (2013.01); *H01F 2003/106* (2013.01)

(58) Field of Classification Search
CPC ....... H02J 50/12; H01F 27/362; H01F 27/365
See application file for complete search history.

(56) References Cited

U.S. PATENT DOCUMENTS

| | | | | |
|---|---|---|---|---|
| 2015/0077047 | A1* | 3/2015 | Chen | ............... H02J 7/025 320/108 |
| 2015/0303561 | A1* | 10/2015 | Yang | ............... H01Q 1/2266 343/842 |
| 2016/0072302 | A1* | 3/2016 | Von Novak, III | ...... H02J 5/005 307/104 |

\* cited by examiner

*Primary Examiner* — Jeffrey Shin
(74) *Attorney, Agent, or Firm* — Birch, Stewart, Kolasch & Birch, LLP

(57) ABSTRACT

Embodiments provide a wireless power receiving device. The wireless power receiving device having a metal body, includes a hole formed in one side of the metal body, a plastic film having a logo displayed on a surface thereof so as to be exposed outward through the hole, a receiving coil attached to a remaining surface of the plastic film, a first magnetism-shielding material attached to a surface of the receiving coil, and a second magnetism-shielding material formed on a bonding plane of the receiving coil and the metal body. The wireless power receiving device may minimize heat emission and power consumption by preventing the generation of eddy current due to the metal body thereof.

15 Claims, 9 Drawing Sheets

WIRELESS POWER RECEIVING DEVICE

CROSS REFERENCE TO RELATED APPLICATION

This application claims priority under 35 U.S.C. § 119(e) to U.S. Provisional Patent Application No. 62/248,579, filed on Oct. 30, 2015, which is hereby incorporated in its entirety by reference as if fully set forth herein.

TECHNICAL FIELD

Embodiments relate to wireless power transmission technology, and more particularly, to the configuration of a receiving antenna, which may achieve the maximum wireless power reception efficiency and minimum heat emission of a wireless power receiving device having a metal body, and a wireless power receiving device equipped with the receiving antenna.

BACKGROUND

With the recent rapid development of information communication technology, a ubiquitous society based on information communication technology is being realized.

In order to ensure the connection of information communication appliances regardless of time and place, it is necessary to install sensors, in which computer chips having a communication function are mounted, to all facilities in society. Thus, the supply of power to these appliances or sensors is becoming a new issue. In addition, as the kinds of portable appliances such as, for example, mobile phones and music players including Bluetooth headsets and iPods are rapidly increasing, users need to consume time and effort to charge batteries. As a method to solve this problem, wireless power transmission technology has recently received attention.

Wireless power transmission or wireless energy transfer technology is technology for transmitting power from a transmitter to a receiver in a wireless manner using the induction of a magnetic field. An electric motor or a transformer using the principle of electromagnetic induction has been in use since the 1800s, after which time methods for transmitting electric energy by radiating electromagnetic waves such as radio waves or lasers have been attempted. In fact, electric toothbrushes or some wireless razors that we frequently use are charged based on the principle of electromagnetic induction.

At present, wireless energy transfer may basically be categorized into electromagnetic induction, electromagnetic resonance, and power transmission using short-wave radio-frequency.

Electromagnetic induction is technology in which, when current is applied to one of two coils that have been moved close to each other, magnetic flux generated by the coil induces electromotive force in the other coil. The commercialization of this technology is rapidly underway, with small appliances, such as mobile phones, as the center. Electromagnetic induction enables the transmission of power of a maximum of hundreds of kilowatts (kWs) and exhibits high efficiency, but disadvantageously requires that the corresponding appliance be brought close to a charger or the ground because the maximum transmission distance thereof is 1 cm or shorter.

Electromagnetic resonance is characterized in that it uses an electric field or a magnetic field, rather than using, for example, electromagnetic waves or current. Electromagnetic resonance has an advantage in that it is safe for other electronic appliances or the human body because it is almost free from problems related to electromagnetic waves. However, electromagnetic resonance may be utilized only within a limited distance and space, and suffers from somewhat low energy transfer efficiency.

Short-wave radio-frequency power transmission, simply referred to as RF power transmission, is based on the fact that energy may be directly transmitted and received in a radio wave form. This technology is RF type wireless power transmission using a rectenna. "Rectenna" is a portmanteau of "antenna" and "rectifier", and refers to a device that directly converts RF power into DC current. That is, RF power transmission is technology for changing AC radio waves into DC current, and a recent increase in efficiency causes an active study on the commercialization of RF power transmission.

Wireless power transmission technology may be variously utilized across various industries including, for example, mobile phones and the IT, railway, and consumer-electronics industries.

However, in the case of a conventional wireless power receiving device having a metal body, the magnetic field, transmitted by a wireless power transmitting device, may be absorbed by the metal body, which problematically causes deterioration in wireless power transmission efficiency and the emission of heat from the metal body.

SUMMARY

Embodiments are devised to solve the problems of the related art described above, and provide a wireless power receiving device, which may maximize wireless power transmission efficiency and minimize heat emission.

In addition, embodiments provide a wireless power receiving device, which may prevent deterioration in power transmission efficiency attributable to a metal body included in the wireless power receiving device.

In addition, embodiments provide a wireless power receiving device, which may prevent a metal body included in the wireless power receiving device from absorbing the magnetic field transmitted by a wireless power transmitting device, and thus emitting heat.

Technical objects that to be accomplished by the disclosure are not limited to the aforementioned technical objects, and other unmentioned technical objects will be clearly understood from the following description by those having ordinary skill in the art.

Embodiments may provide a wireless power receiving device.

In one embodiment, a wireless power receiving device having a metal body includes a hole formed in one side of the metal body, a plastic film having a logo displayed on a surface thereof so as to be exposed outward through the hole, a receiving coil attached to a remaining surface of the plastic film, a first magnetism-shielding material attached to a surface of the receiving coil, and a second magnetism-shielding material formed on a bonding plane of the receiving coil and the metal body.

At this time, the receiving coil may have a smaller planar area than a corresponding planar area of the hole.

In addition, the first magnetism-shielding material may be attached, at one side thereof, to one side of the metal body so as to fix the receiving coil and the plastic film.

In one example, the wireless power receiving device may further include a third magnetism-shielding material applied to a surface portion of the metal body around the hole.

Here, an area, to which the third magnetism-shielding material is applied, may be determined based on a shape and size of a transmitting coil, the transmitting coil being mounted in a wireless power transmitting device configured to supply power to the wireless power receiving device in a wireless manner.

In another example, the wireless power receiving device may further include a third magnetism-shielding material applied to an entire surface of the metal body excluding the hole.

In addition, at least one of the first to third magnetism-shielding materials may be formed using any one of sintered Ni—Zn ferrite, half-sintered Mn—Zn ferrite, amorphous FeSiB ribbon, and Sendust-Si.

In addition, at least one of the first to third magnetism-shielding materials may include metal-based magnetic powder, which is formed of one element or a combination of two or more elements selected from among Fe, Ni, Co, Mo, Si, Al, and B, and a polymer composite.

In addition, at least one of the first to third magnetism-shielding materials may include ferrite-based powder, which is formed of a combination of two or more elements selected from among Fe, Ni, Mn, Zn, Co, Cu, and Ca, and a polymer composite.

In addition, at least one of the first to third magnetism-shielding materials may be a ferrite-based sintered material formed of a combination of two or more elements selected from among Fe, Co, Ba, Sr, Zn, Ti, and Sn.

In addition, at least one of the first to third magnetism-shielding materials may be permalloy.

In addition, when the wireless power receiving device is a smart phone, the metal body may be mounted to a portion of a rear surface of the smart phone, or an entire rear surface of the smart phone.

In addition, a planar area of the plastic film may be greater than a planar area of the receiving coil and may be equal to or less than a planar area of the hole.

In addition, a diameter and thickness of the receiving coil may be set based on a diameter of the hole formed in the metal body.

In addition, a diameter of the hole formed in the metal body may be set based on a diameter of a transmitting coil, the transmitting coil being mounted in a wireless power transmitting device configured to supply power to the wireless power receiving device in a wireless manner.

The embodiments are merely some of exemplary embodiments, and various other embodiments, which have the technical features of the embodiments, will be devised and understood based on the following detailed description by those having ordinary skill in the art.

BRIEF DESCRIPTION OF THE DRAWINGS

The accompanying drawings are provided to assist the understanding of the disclosure, and provide embodiments in conjunction with the detailed description. However, the technical features of the disclosure are not limited to specific drawings, and the features illustrated in the respective drawings may be combined to configure new embodiments.

The embodiments may be described in detail with reference to the following drawings in which like reference numerals refer to like elements and wherein.

DESCRIPTION OF SPECIFIC EMBODIMENTS

Hereinafter, various devices and methods in accordance with exemplary embodiments will be described in detail with reference to the accompanying drawings. With respect to constituent elements used in the following description, suffixes "module" and "unit" are given or mingled with each other only in consideration of ease in the preparation of the specification, and do not have or serve as different meanings.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In the following description of the embodiments, for convenience of description related to a wireless power transmitting device that constitutes a wireless power transmitting system, the terms, for example, "transmitter", "transmitting terminal", "transmitting device", "transmitting side", and "power transmitting device" are used interchangeably with one another. In addition, in order to indicate a wireless power receiving device, for convenience of description, the terms, for example, "receiver", "receiving terminal", "receiving side", "receiving device", and "power receiving device" may be used interchangeably with one another.

A transmitter in accordance with the embodiments may be configured as a pad or a support base, and a single transmitter may include a plurality of wireless power transmitting elements so as to transmit power to a plurality of receivers in a wireless manner.

A receiver in accordance with the embodiments may be, for example, a mobile phone, smart phone, laptop computer, digital broadcasting terminal, personal digital assistant (PDA), portable multimedia player (PMP), navigation system, MP3 player, or any other small electronic appliance, but is not limited thereto, and may be any of various other appliances so long as it is equipped with a wireless power receiving element in accordance with the embodiments such that a battery thereof is chargeable.

Figure 1:
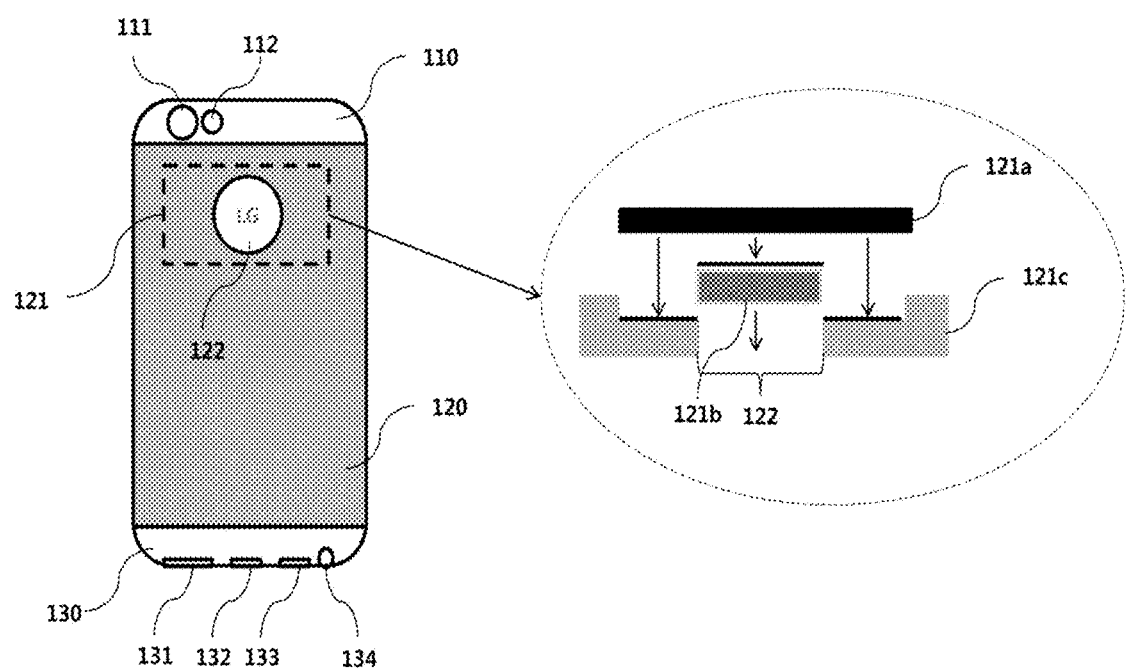
FIG. 1 is a view illustrating the configuration of a conventional wireless power receiving device.

FIG. 1 is a view illustrating the configuration of a conventional wireless power receiving device.

Specifically, FIG. 1 is a view illustrating the configuration of a smart phone in which a manufacturer's logo is exposed outward through a logo hole formed in one side of a conventional metal body.

Referring to FIG. 1, the rear surface of the smart phone having a conventional metal body may basically include an upper body 110, a center body 120, and a lower body 130.

The upper body 110 may be provided on one side thereof with a camera 111 and a flashlight 112 and an antenna for wireless communication may also be mounted in one side of the upper body 110. A portion of the upper body 110 or the entire upper body 110 may be formed of a plastic material, rather than a metal material, for normal wireless communication.

The center body 120 may be formed of a metal material, and a hole 122 may be formed in one side of the center body 120 to enable, for example, near-field communication (NFC) or radio frequency identification (RFID). In one example, although the hole 122 may have a circular shape or the shape of a manufacturer's logo, this is merely one embodiment, and it is to be noted that the shape of the hole 122 may be changed based on the shape of the smart phone and the manufacturer's selection. In addition, although the metal material of the center body 120 may be an aluminum material, this is merely one embodiment, and various metal materials such as, for example, titanium and tungsten may be used based on the manufacturer's selection. A logo 121b, which is formed of a plastic material so as not to intercept or interfere with electromagnetic waves, may be mounted in the hole 122.

In addition, an adhesive sheet 121a may be affixed to one surface of the plastic logo 121b in order to prevent the plastic logo 121b from being discharged out of the hole 122. In one example, as represented by reference numeral 121, a portion of the adhesive sheet 121a may be attached to one surface of the metal body 121c so as to fix the plastic logo 121b.

Assuming that near-field wireless communication is not performed through the hole 122, although the adhesive sheet 121a in accordance with one embodiment may be a metallic adhesive sheet, this is merely one embodiment, and a plastic adhesive sheet may be used in another embodiment.

The lower body 130 may include, for example, a speaker 131, an external power source and device connection port 132, a microphone 133, and an earphone connection port 134.

The lower body 130 may be formed of a metal material, or a portion of the lower body or the entire lower body 130 may be formed of a plastic material.

Figure 2:
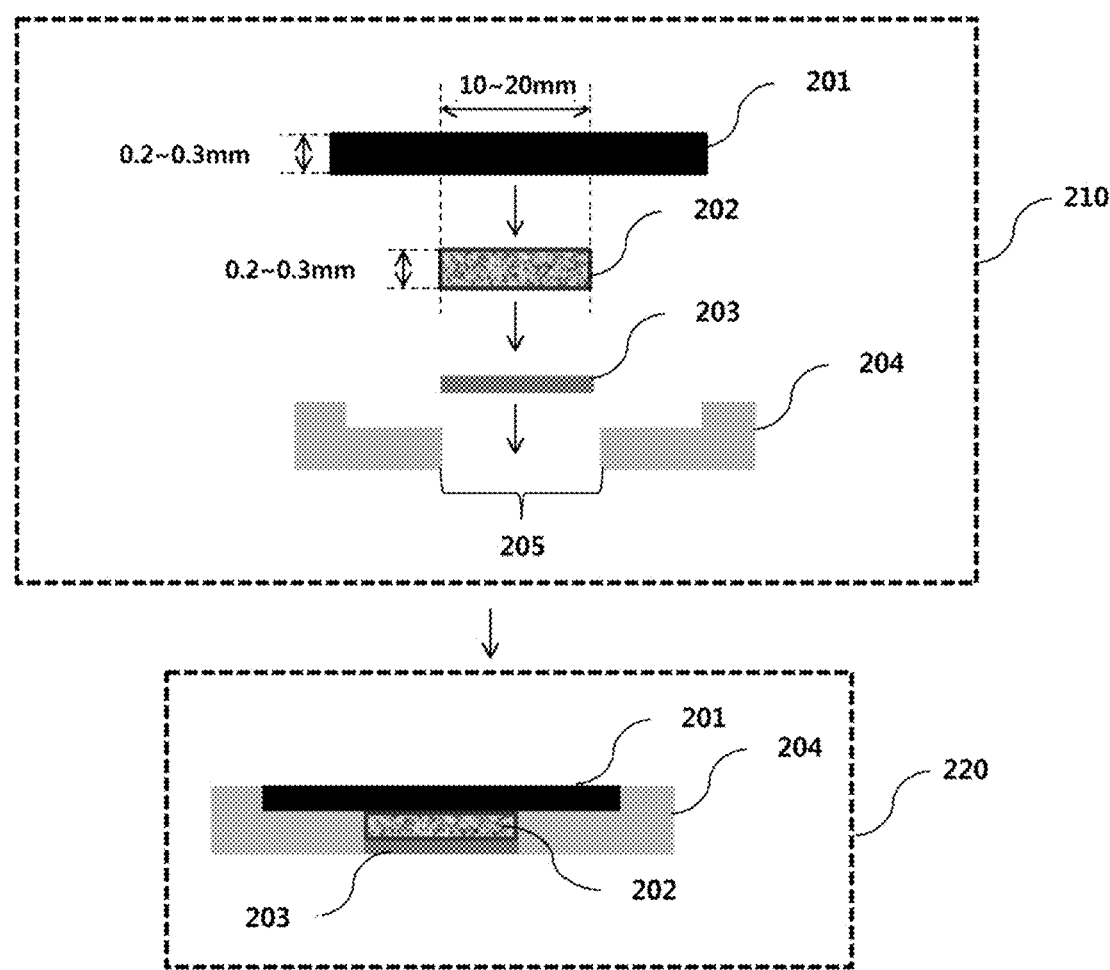
FIG. 2 is a sectional view illustrating the mounting configuration of a receiving antenna provided in a wireless power receiving device in accordance with one embodiment.

FIG. 2 is a sectional view illustrating the mounting configuration of a receiving antenna provided in a wireless power receiving device in accordance with one embodiment.

Considering the configuration of the cross section in which a receiving antenna is mounted, as represented by reference numeral 210, a plastic logo 203 is inserted into a hole 205, which is formed in one side of a metal housing or a metal body 204, which forms the rear surface of a smart phone, so as to be exposed outward. A receiving coil 202 may be stacked on top of the plastic logo 203, and in turn, a magnetism-shielding sheet 201 may be stacked on top of the receiving coil 202.

The receiving coil 202, which is used to receive power in a wireless manner, may ultimately be mounted as represented by reference numeral 220. In one example, the receiving coil 202 may have a diameter within a range from 10 mm to 20 mm and a thickness within a range from 0.2 mm to 0.3 mm, without being limited thereto, and it is to be noted that the thickness and diameter of the receiving coil 202 may be set differently based on the thickness and diameter of a transmitting coil mounted in a wireless power transmitter and based on the intended use and configuration of the wireless power receiving device in which the receiving coil 202 is mounted. In addition, the magnetism-shielding sheet 201 may have a thickness within a range from 0.2 mm to 0.3 mm, and may have a larger area than the receiving coil 202 so as to sufficiently block a magnetic field generated by the receiving coil 202.

In one example, when the transmitting coil has a diameter of 12 mm, the diameter and thickness of the receiving coil 202 may be 10 mm and 150 μm respectively and the plastic logo 203 inserted into the hole 205 may have a diameter of 13 mm.

In another example, when the transmitting coil has a diameter of 25 mm, the diameter and thickness of the receiving coil 202 may be 16 mm and 300 μm respectively and the plastic logo 203 may have a diameter of 22 mm. At this time, the diameter of the hole 205 may be equal to or greater than the diameter of the transmitting coil.

In one embodiment, a double-sided adhesive may be applied to the upper and lower surfaces of the receiving coil 202. Thus, the plastic logo 203 and the magnetism-shielding sheet 201 may be attached respectively to opposite surfaces of the receiving coil 202, and the plastic logo 203 may be fixed in the hole 205.

In one embodiment, the plastic logo 203 may take the form of a film and the receiving coil 202 may be a lead frame pattern coil, without being limited thereto. It is to be noted that the receiving coil in accordance with another embodiment may be, for example, a copper plate etching coil or a printed circuit board (PCB) pattern coil.

In one example, the receiving coil may be configured as a stack including a plastic film, which displays a logo that is exposed outward through the hole formed in one side of the rear surface of a device main body, a lead frame pattern coil mounted on one surface of the plastic film, and a magnetic sheet mounted on one surface of the lead frame pattern coil.

Figure 3:
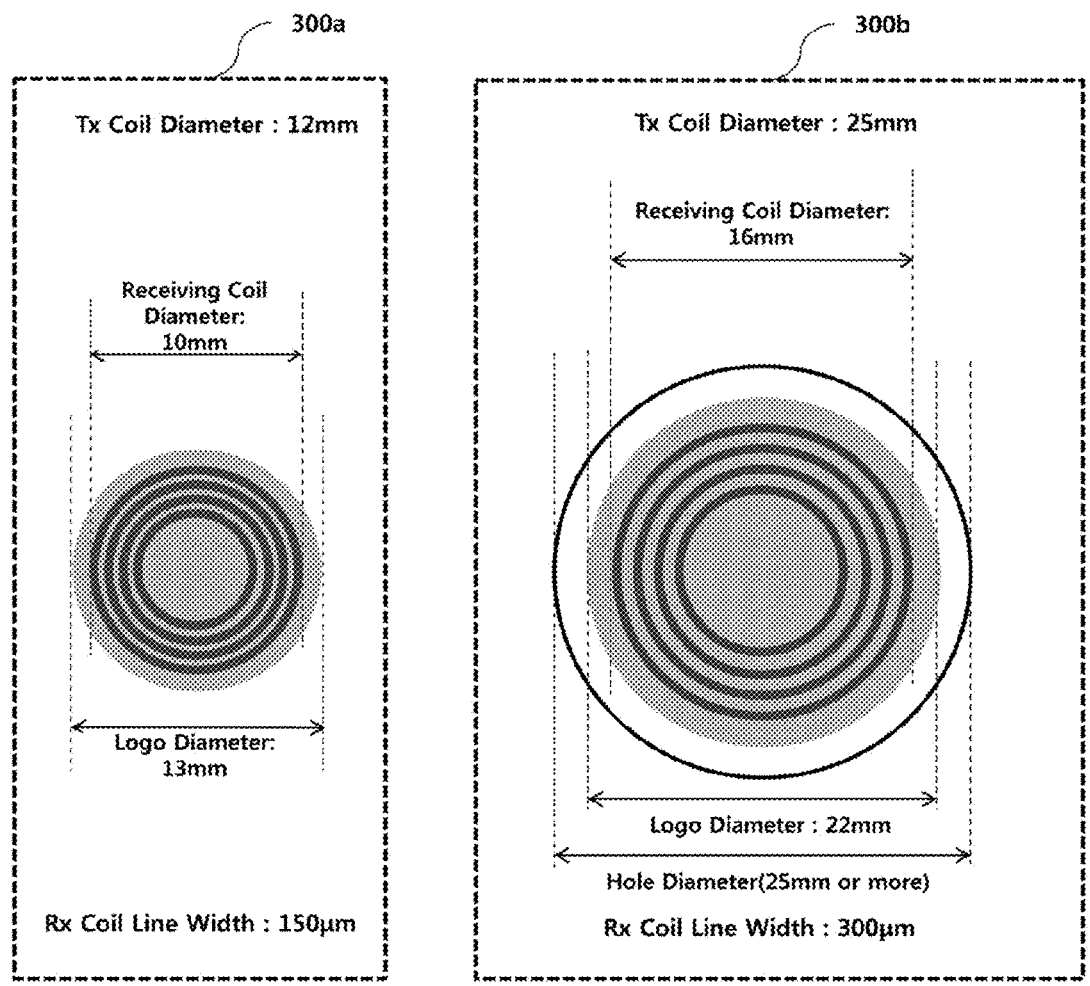
FIG. 3 is a view illustrating the specification of a receiving coil mounted in a wireless power receiving device in accordance with one embodiment.

FIG. 3 is a view illustrating the specification of a receiving coil mounted in a wireless power receiving device in accordance with one embodiment.

The receiving coil, which is provided in the wireless power receiving device in accordance with one embodiment, may be mounted inside a logo hole, which is formed in one side of a metal body, which forms the rear surface of a device main body. At this time, the planar area of the receiving coil may be equal to or less than the size of the logo hole, i.e. the corresponding planar area of the logo hole, without being limited thereto.

Referring to reference numeral 300a, when a transmitting coil, which is mounted in a wireless power transmitting device, has a diameter of 12 mm, the diameter and thickness of the receiving coil mounted in the wireless power receiving device may be 10 mm and 150 μm respectively and a plastic logo inserted into the hole formed in the metal body may have a diameter of 13 mm.

Referring to reference numeral 300b, when a transmitting coil, which is mounted in a wireless power transmitting device, has a diameter of 25 mm, the diameter and thickness of the receiving coil mounted in the wireless power receiving device may be 16 mm and 300 μm respectively and the plastic logo inserted into the hole formed in the metal body may have a diameter of 22 mm. At this time, the diameter of the hole formed in one side of the metal body may be greater than the diameter of the transmitting coil in order to maximize power reception efficiency.

Figure 4:
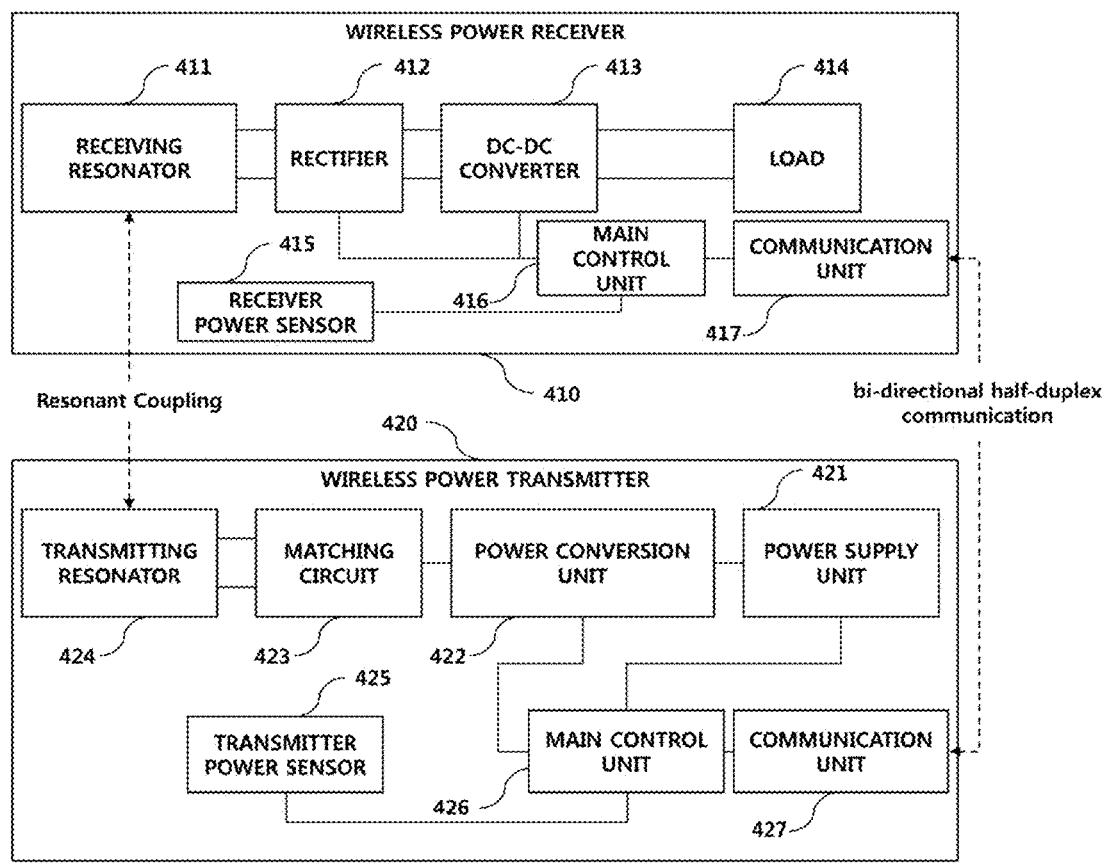
FIG. 4 is a system block diagram illustrating wireless power transmission using electromagnetic resonance in accordance with one embodiment.

FIG. 4 is a system block diagram illustrating wireless power transmission using electromagnetic resonance in accordance with one embodiment.

Referring to FIG. 4, the wireless power transmitting system may include a wireless power transmitter 420 and a wireless power receiver 410.

Although FIG. 4 illustrates that the wireless power transmitter 420 transmits power in a wireless manner to a single wireless power receiver 410, this is merely one embodiment, and the wireless power transmitter 420 in accordance with another embodiment may transmit power in a wireless manner to a plurality of wireless power receivers 410, so as to perform wireless charging. It is to be noted that the wireless power receiver 410 in accordance with a further embodiment may receive power in a wireless manner from a plurality of wireless power transmitters 420 at the same time.

The wireless power transmitter 420 generates a magnetic field using a specific operating frequency that is allocated for wireless power transmission, and the wireless power receiver 410 may generate power using the magnetic field received via a receiving coil so as to charge a load provided therein.

The wireless power receiver 410 may receive power at the same frequency as the operating frequency used by the wireless power transmitter 420.

In one example, the operating frequency used for wireless power transmission may be 6.78 MHz, without being limited thereto.

That is, a power signal output from the wireless power transmitter 420 may be transmitted to the wireless power receiver 410 via resonance.

The maximum number of wireless power receivers 410 that may receive power from a single wireless power transmitter 420 may be determined based on, for example, the maximum power transmission level of the wireless power transmitter 420, the maximum power receiving level of each wireless power receiver 410, and the physical shape and configuration of the wireless power transmitter 420 and each wireless power receiver 410.

The wireless power transmitter 420 and the wireless power receiver 410 may perform bi-directional communication in a frequency band, which is different from a frequency band for wireless power transmission, i.e. a resonance frequency band. In one example, bi-directional communication may adopt a half-duplex Bluetooth low energy (BLU) communication protocol using a 2.4 GHz band, without being limited thereto, and may adopt, for example, near field communication (NFC), radio frequency identification (RFID) communication, or ultra wideband (UWB) communication.

The wireless power transmitter 420 and the wireless power receiver 410 may exchange characteristic and state information thereof, for example, power negotiation information for mutual power level control via bi-directional communication.

In one example, the wireless power receiver 410 may transmit prescribed power reception state information for power level control received from the wireless power transmitter 420 to the wireless power transmitter 420 via bi-directional communication. At this time, the wireless power transmitter 420 may dynamically control a transmission power level based on the received power reception state information. In this way, the wireless power transmitter 420 may optimize power transmission efficiency, and may provide, for example, the function of preventing load damage attributable to, for example, over-voltage or overheat, and the function of preventing unnecessary power consumption attributable to under-voltage.

In addition, the wireless power transmitter 420 may perform, via bidirectional communication, authentication or identification of the wireless power receiver 410, exchange of information about the configuration and state of the wireless power receiver 410, detection of a foreign object that is incompatible or is impossible to charge, detection of an available load, acquisition of information about charging completion state, checking for system errors and warnings, and distribution of power to a plurality of receivers, for example.

Hereinafter, the process of wireless power transmission using electromagnetic resonance will be described in more detail with reference to FIG. 4.

The wireless power transmitter 420 may include a power supply unit 421, a power conversion unit 422, a matching circuit 423, a transmitting resonator 424, a transmitter power sensor 425, a main control unit 426, and a communication unit 427. Here, the communication unit 427 may include a data transmitter configured to transmit control information to the wireless power receiver, and a data receiver configured to receive control information from the wireless power receiver.

The power supply unit 421 may supply a specific supply voltage to the power conversion unit 42 under the control of the main control unit 426. This supply voltage may be a DC voltage or an AC voltage.

The power conversion unit 422 may convert the voltage received from the power supply unit 421 to a specific voltage under the control of the main control unit 426. To this end, the power conversion unit 422 may include at least one of a DC-DC converter, an AC-DC converter, and a power amplifier.

The matching circuit 423 is a circuit that performs impedance matching between the power conversion unit 422 and the transmitting resonator 424 in order to maximize power transmission efficiency.

The transmitting resonator 424 may transmit power in a wireless manner using a specific resonance frequency based on the voltage applied from the matching circuit 423.

The transmitter power sensor 425 may measure the intensity of voltage, current, or power at each terminal of the transmitter and may provide the main control unit 426 with the measured result. In one example, the transmitter power sensor 425 may transmit the intensity of output voltage/current/power of the power supply unit 421, the intensity of output voltage/current/power of the power conversion unit 422, and the output voltage/current/power of the matching circuit 423, and transmit the same to the main control unit 426.

The wireless power transmitting device 420 in accordance with one embodiment may further include a prescribed temperature sensor configured to measure the temperature inside the wireless power transmitting device 420. In this case, the temperature sensor may provide the main control unit 426 with measured temperature information, and the main control unit 426 may judge whether overheating occurs based on the temperature information received from the temperature sensor and may perform power transmission control based on the judged result.

The wireless power receiver 410 may include a receiving resonator 411, a rectifier 412, a DC-DC converter 413, a load 414, a receiver power sensor 415, a main control unit 416, and a communication unit 417. The communication unit 417 may include a data transmitter and a data receiver.

The receiving resonator 411 may receive power output by the transmitting resonator 424 using resonance.

The rectifier 412 may function to convert an AC voltage applied through the receiving resonator 411 into a DC voltage.

The DC-DC converter 413 may convert the rectified DC voltage into a specific DC voltage required for the load 414.

The receiver power sensor 415 may measure the intensity of voltage, current, or power at each terminal of the receiving device and may provide the main control unit 416 with the measured result. In one example, the receiver power sensor 415 may transmit the intensity of output voltage/current/power of the receiving resonator 411, the intensity of output voltage/current/power of the rectifier 412, or the output voltage/current/power of the DC/DC converter 413, and transmit the same to the main control unit 416.

The wireless power receiving device 410 in accordance with one embodiment may further include a prescribed temperature sensor configured to measure the temperature inside the wireless power receiving device 410. In this case, the temperature sensor may provide the main control unit 416 with measured temperature information, and the main controller 416 may judge whether overheating occurs based on the temperature information received from the temperature sensor. Upon judging that overheating occurs, the main control unit 416 may transmit a prescribed warning message that indicates the occurrence of overheating to the wireless power transmitter 420 via the communication unit 417.

The main control unit 416 may control the operation of the rectifier 412 and the DC-DC converter 413 or generate characteristic and state information of the wireless power receiver 410, and may transmit the generated characteristic and state information to the wireless power transmitter 420 via the communication unit 417. In one example, the main controller 416 may monitor the intensity of voltage and current output from the rectifier 412 and the DC-DC converter 413, and may control an over-voltage/over-current interception circuit provided therein when over-voltage/over-current is sensed, so as to intercept the transmission of over-voltage/over-current to the load 414.

In one example, the monitored information about the intensity of rectifier output voltage and current may be transmitted to the wireless power transmitter 420 via the communication unit 417.

In addition, the main control unit 416 may compare a rectified DC voltage with a prescribed reference voltage so as to judge whether a voltage state corresponds to over-voltage or under-voltage. When a system error is sensed based on the judged result, the main control unit 416 may transmit the sensed result to the wireless power transmitter 420 via the communication unit 417.

In addition, when the system error is sensed, the main control unit 416 may control the operation of the rectifier 412 and the DC-DC converter 413 in order to prevent damage to the load 414, or may control a prescribed over-current interception circuit including switches and/or Zener diodes, thereby performing control to prevent a voltage of a prescribed reference value or higher from being applied to the load 414.

Although FIG. 4 illustrates that the main control unit 416 or 426 and the communication unit 417 or 427 of each of the receiver 410 and the transmitter 420 are configured as different modules, this is merely one embodiment, and it is to be noted that, in another embodiment, the main control unit 416 or 426 and the communication unit 417 or 427 may constitute a single module.

When the wireless power transmitter 420 in accordance with one embodiment senses an event, such as, for example, the introduction of a new wireless power receiver to the charging area while another wireless power receiver is charging, the disconnection of a wireless power receiver, currently being charged, therefrom, or the completion of charging of a wireless power receiver, the wireless power transmitter 420 may perform power redistribution with respect to the remaining wireless power receivers being charged. At this time, the result of power redistribution may be transmitted to the connected wireless power receiver(s) via out-of-band communication.

Figure 5:
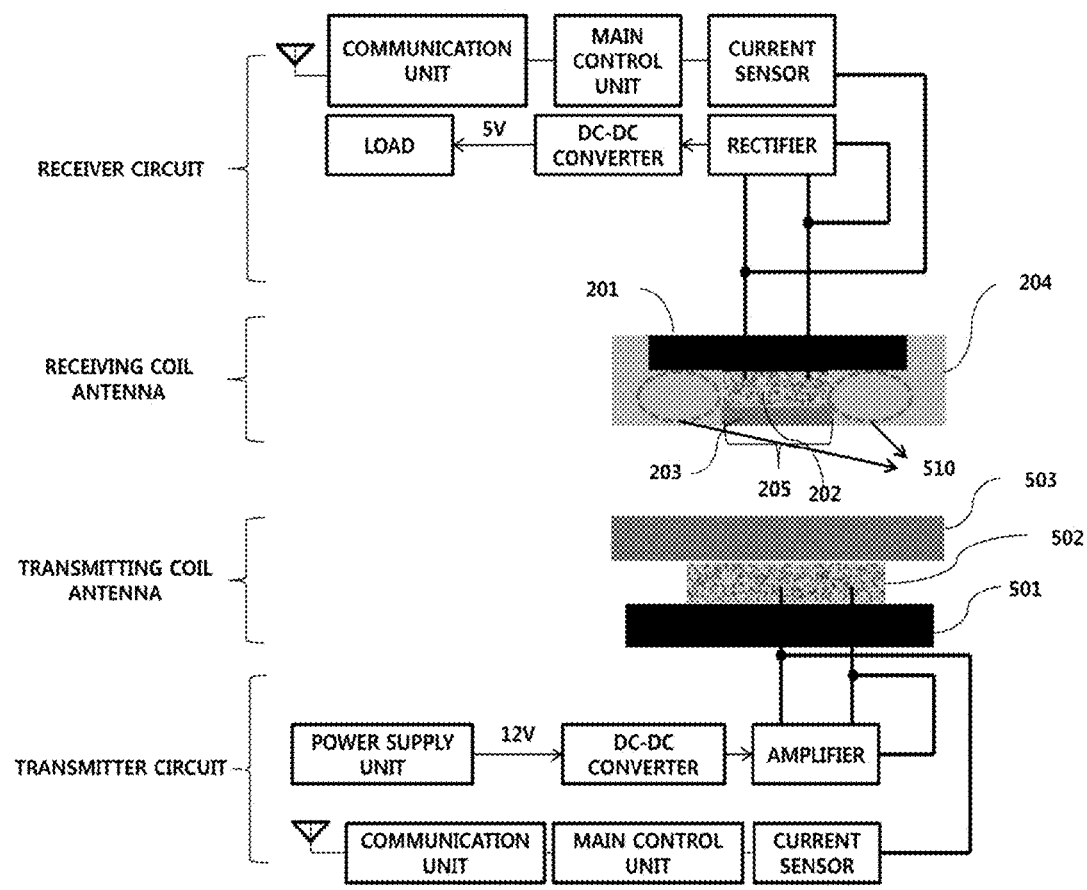
FIG. 5 is a view illustrating problems with the configuration of the receiving coil antenna illustrated in FIG. 2.

FIG. 5 is a view illustrating problems with the configuration of the receiving coil antenna illustrated in FIG. 2.

As illustrated in FIG. 5, a wireless power transmitting device may include a DC-DC converter, an amplifier, a main control unit (MCU), a current sensor, and a communication unit, for example.

A wireless power receiving device may include a rectifier configured to convert an AC signal received through the receiving coil 202 into a DC signal, a DC-DC converter configured to convert the rectified DC signal into a specific DC voltage, a current sensor configured to measure the current passing through a specific port in the wireless power receiving device, a main control unit (MCU), and a communication unit, for example. Here, the communication unit may have a Bluetooth low energy communication function.

Referring to FIG. 5, a transmitting coil antenna of the wireless power transmitter may include a magnetism-shielding material 501 configured to prevent the transfer of magnetic force to a transmitter circuit, and a transmitting coil 502 located between the magnetism-shielding material 501 and a charge bed 503.

AC power delivered through the transmitting coil 502, i.e. a magnetic field may be transmitted to the receiving coil 202 through the plastic logo 203, which is mounted in one side of the metal body 402 of the wireless power receiver. However, electromotive force depending on the magnetic flux of a magnetic material may be generated in the area designated by reference numeral 510, and eddy current may be generated in the metal body 204 by the electromotive force. The power lost due to eddy current may be changed into heat, thus causing an increase in the temperature of an area around the logo hole 203 in the metal body 204 of the wireless power receiver, i.e. the area designated by reference numeral 510. An increase in the temperature of the wireless power receiver may interrupt charging when the overheating is sensed. In addition, charge efficiency may be remarkably deteriorated due to power absorption by the metal body 204 (i.e. heat loss).

Figure 6:
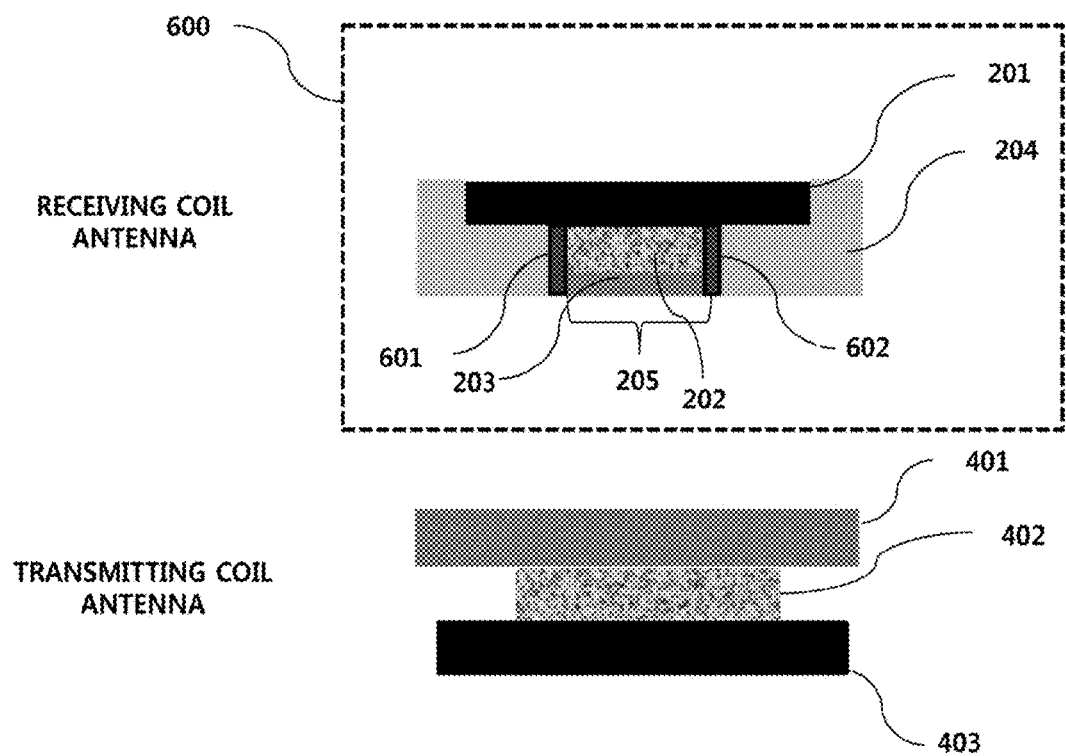
FIG. 6 is a view illustrating the magnetism-shielding configuration of the receiving coil antenna in order to prevent the loss of power and the occurrence of overheating due to eddy current of FIG. 5 in accordance with one embodiment.

FIG. 6 is a view illustrating the magnetism-shielding configuration of the receiving coil antenna in order to prevent the loss of power and the occurrence of overheating due to eddy current in FIG. 5 in accordance with one embodiment.

As illustrated by reference numeral 600 in FIG. 6, in order to prevent the loss of power and the occurrence of overheating due to eddy current in FIG. 5, the receiving coil antenna may further include a cylindrical magnetism-shielding wall 601 and 602 between the metal body 204 and the receiving coil 202.

Although the embodiment of FIG. 6 illustrates that the magnetism-shielding wall 601 and 602 is provided in the plane in which the receiving coil 202 and the plastic logo 203 come into contact with the metal body 204, this is merely one embodiment, and a magnetism-shielding wall in accordance with another embodiment may be provided only in the plane in which the receiving coil 202 and the metal body 204 come into contact with each other.

The magnetism-shielding configuration of the receiving coil antenna illustrated in FIG. 6 may be advantageous in the case where the size of the transmitting coil 502 is similar to or the same as the size of the receiving coil 202. However, when the transmitting coil 502 is much larger than the receiving coil 202, a portion of the magnetic field generated by the transmitting coil 502 may be induced to the receiving coil 202 through the logo hole 205 and the remainder of the magnetic field may be absorbed by the metal body 204 around the logo hole 205. At this time, the absorbed magnetic field may generate eddy current in one side of the metal body 204, thus increasing the surface temperature of the metal body 204. The emission of heat from the metal body 204 may increase the temperature inside the wireless power receiver as well as the temperature inside the wireless power transmitter.

Figure 7:
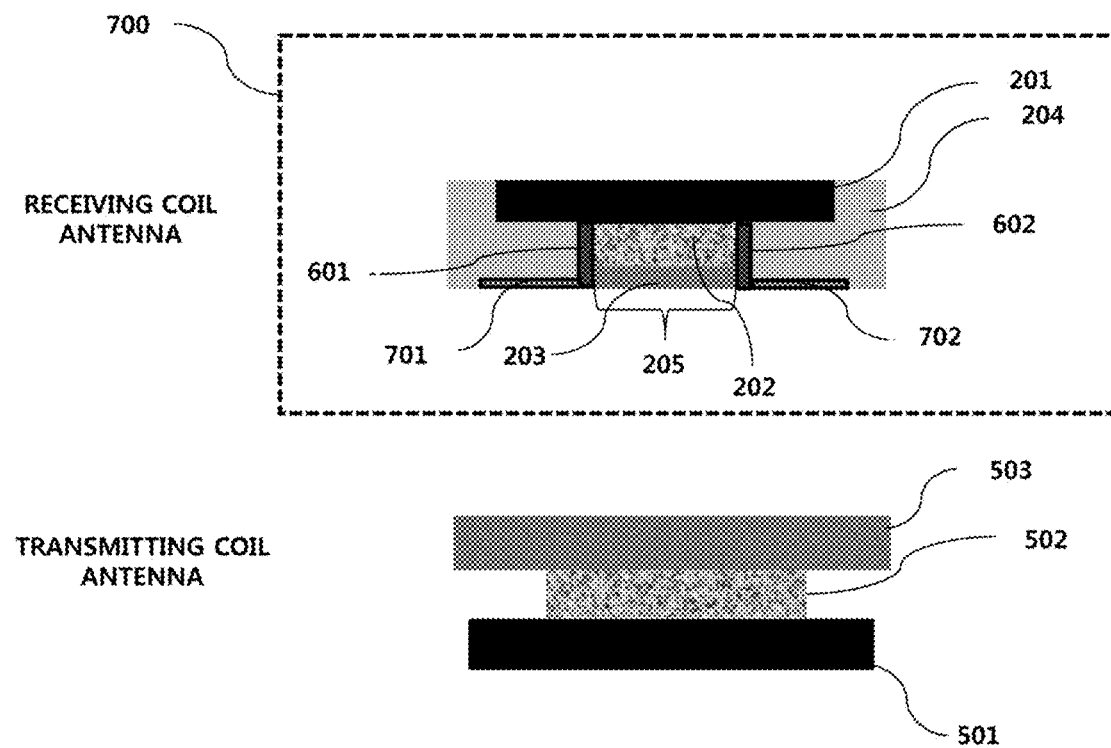
FIG. 7 is a view illustrating the magnetism-shielding configuration of the receiving coil antenna in order to prevent the loss of power and the occurrence of overheating due to eddy current of FIG. 5 in accordance with another embodiment.

FIG. 7 is a view illustrating the magnetism-shielding configuration of the receiving coil antenna in order to prevent the loss of power and the occurrence of overheating due to eddy current of FIG. 5 in accordance with another embodiment.

As illustrated by reference numeral 700 in FIG. 7, in order to prevent the loss of power and the occurrence of overheating due to eddy current in FIG. 5, the cylindrical magnetism-shielding wall 601 and 602 may be provided between the metal body 204 and the receiving coil 202, and a magnetism-shielding material 701 and 702 may be applied in a small thickness to or a thin film type magnetic shielding sheet may be attached to the surface of the metal body 204 within a prescribed radius around the logo hole 205. In this way, the generation of eddy current due to the metal body 204 may be minimized. Of course, by minimizing the generation of eddy current, the emission of heat may be minimized and the consumption of power may be minimized.

In one example, in the case where the wireless power receiving device is a smart phone having a metal body, a magnetism-shielding material to be attached to a portion of the surface of the metal body, which forms the rear surface of a smart phone main body, may be attached in a sheet form, or may be attached via, for example, plating or sputtering.

Figure 8:
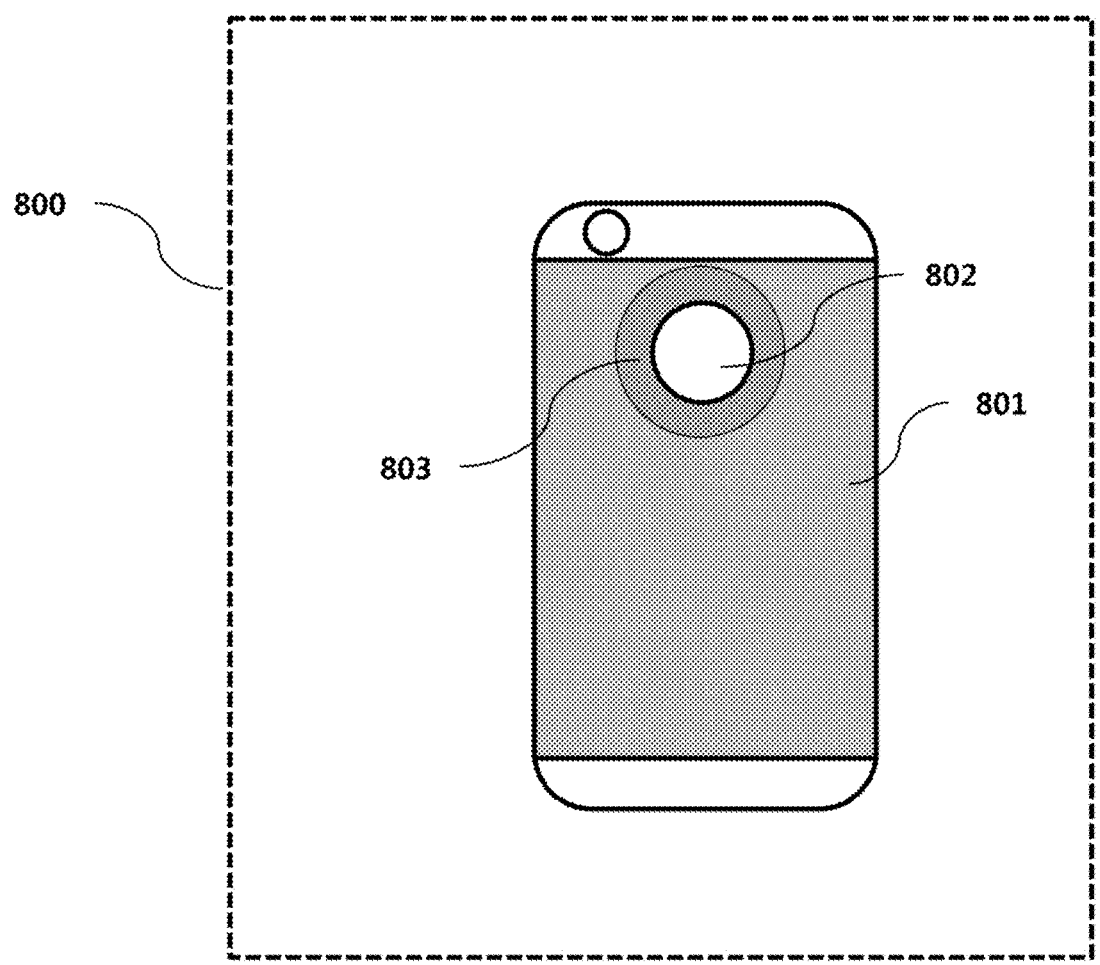
FIG. 8 is a view illustrating one exemplary method of attaching a magnetism shield to the rear surface of the main body of a smart phone based on the magnetism-shielding configuration of the receiving coil antenna illustrated in FIG. 7.

FIG. 8 is a view illustrating one exemplary method of attaching a magnetism-shielding material to the rear surface of the main body of a smart phone based on the magnetism-shielding configuration of the receiving coil antenna illustrated in FIG. 7.

Referring to reference numeral 800 in FIG. 8, one side of the rear surface of the smart phone may be formed of a metal body 801, and a logo hole 802 for mounting a manufacturer logo may be formed in one side of the metal body 801. At this time, a thin film type magnetism-shielding material may be applied to the portion of the surface of the metal body 801 that surrounds the logo hole 802, for example, the area designated by reference numeral 803, without being limited thereto.

Although the embodiment of FIG. 8 illustrates that the magnetism-shielding material is applied in a circular form around the logo hole 802, this is merely one embodiment, and the area around the logo hole 802, to which the magnetism-shielding material is applied or attached, may have various shapes such as, for example, triangular, rectangular, oval, and pentagonal shapes. At this time, the shape and size of the area around the logo hole 802 to which the magnetism-shielding material is applied may be determined so as to correspond to the shape and size of the transmitting coil. In one example, when the transmitting coil has a circular shape and the radius is R, the magnetism-shielding material may be applied in a circular form so that the radius thereof is greater than the radius R by a prescribed reference value.

Figure 9:
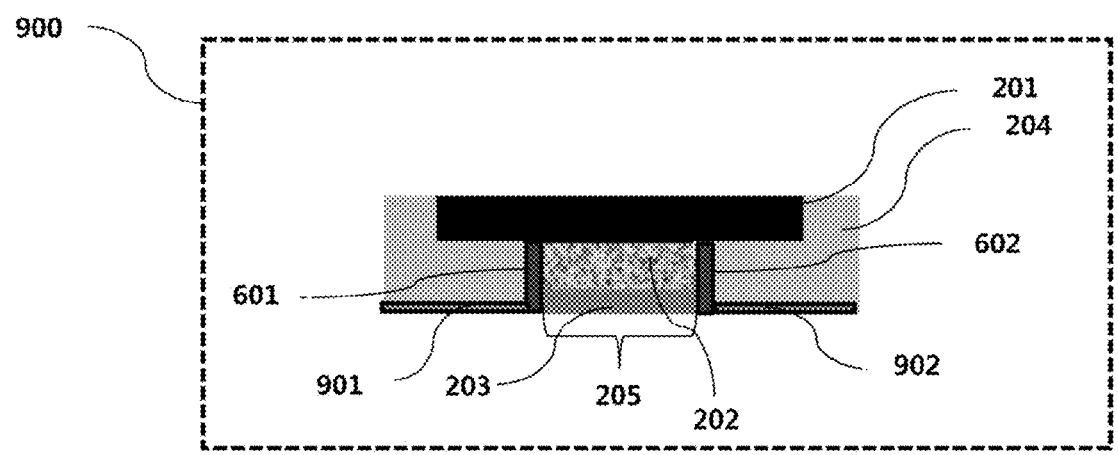
FIG. 9 is a view illustrating the magnetism-shielding configuration of the receiving coil antenna in order to prevent the loss of power and the occurrence of overheating due to eddy current of FIG. 5 in accordance with a further embodiment.

FIG. 9 is a view illustrating the magnetism-shielding configuration of the receiving coil antenna in order to prevent the loss of power and the occurrence of overheating due to eddy current of FIG. 5 in accordance with a further embodiment.

As illustrated in FIG. 9, in a wireless power receiving device, a thin magnetism-shielding material may be applied to the boundary 601 and 602 between the receiving coil and the metal body and to the entire surface 901 and 902 of the metal body, which forms the rear surface of a main body. In this way, the generation of eddy current due to the metal body may be more effectively prevented.

The rear surface body of the smart phone may be divided into the upper body 110, the center body 120, and the lower body 130 as illustrated in FIG. 1. Of course, some products may be configured such that the entire rear surface body is integrally formed. Alternatively, other products may be configured such that the center body 120 and the lower body 130 may be integrally formed, or such that the center body 120 and the lower body 130 are integrally formed.

In addition, some products may be configured such that at least one of the upper body 110, the center body 120 and the lower body 130 is a metal body.

In one example, when the entire rear surface of the smart phone is formed of a metal body, a magnetism-shielding material may be applied to the entire metal body. In another example, when only the center body 120 of the rear surface of the smart phone is formed as a metal body, a magnetism-shielding material may be applied only to the surface of the center body 120. In a further example, when only the center body 120 and the lower body 130 of the rear surface body of the smart phone are formed as metal bodies, a magnetism-shielding material may be applied to the entire surface of the center body 120 and the lower body 130.

In particular, the magnetism-shielding material, which is attached to the entire surface of the metal body, which forms the rear surface of the main body, may be attached in in a sheet form, or may be attached by, for example, plating or sputtering.

In addition, the magnetism-shielding material, which is attached to the entire surface of the metal body, which forms the rear surface of the main body, may provide the function of a magnetic sheet in a low frequency band, and may provide the function of an EMI shielding function in a high frequency band.

Examples of the magnetism-shielding material, used in any one of the embodiments described above, include sintered Ni—Zn ferrite, half sintered Mn—Zn ferrite, amorphous FeSiB ribbon, and Sendust-Si.

In another example, the magnetism-shielding material, used in any one of the embodiments described above, may be configured as a film or coating including metal-based magnetic powder, which is formed of one element or a combination of two or more elements selected from among Fe, Ni, Co, Mo, Si, Al, B and the like, and a polymer composite.

In another example, the magnetism-shielding material, used in any one embodiment of the embodiments described above, may be configured as a film or coating including ferrite-based powder, which is formed of a combination of two or more elements selected from among Fe, Ni, Mn, Zn, Co, Cu, Ca and the like, and a polymer composite.

In another example, the magnetism-shielding material, used in any one of the embodiments described above, may be a ferrite-based sintered material formed of a combination of two or more elements selected from among Fe, Ni, Mn, Zn, Co, Cu, Ca and the like, or may be a half-slitting material for the provision of shock-resistance.

In another example, the magnetism-shielding material, used in any one of the embodiments described above, may be a ferrite-based sintered material formed of a combination of two or more elements selected from among Fe, Co, Ba, Sr, Zn, Ti, and Sn.

In another example, the magnetism-shielding material, used in any one of the embodiments described above, may include ferrite-based powder, which is formed of a combination of two or more elements selected from among Fe, Ni, Mn, Zn, Co, Cu, Ca, Li, Ba, Sr, Ti, and Sn, and a polymer composite.

In a further example, the magnetism-shielding material, used in any one of the embodiments described above, may be permalloy, which is easily magnetized in a weak magnetic field. Examples of permalloy may include FeSi, FeNi, FeCo, and Ni.

As is apparent from the above description, a method and a device in accordance with the embodiments have the following effects.

Embodiments advantageously provide a wireless power receiving device, which may maximize wireless power transmission efficiency and minimize heat emission.

In addition, embodiments advantageously provide a wireless power receiving device, which may prevent deterioration in power transmission efficiency attributable to a metal body included in the wireless power receiving device.

In addition, embodiments advantageously provide a wireless power receiving device, which may prevent a metal body included in the wireless power receiving device from absorbing the magnetic field transmitted by a wireless power transmitting device, and thus emitting heat.

Effects that are obtainable through the disclosure are not limited to the aforementioned effects and other effects not mentioned will be clearly understood from the above description by those skilled in the art.

It will be clear to those skilled in the art that the disclosure may be realized in other specific embodiments within a range not deviating from the spirit and essential features of the disclosure.

Accordingly, the above detailed description should not be construed as limitative, but should be understood by way of example in all aspects. The scope of embodiments should be determined based on the rational interpretation of the accompanying claims, and all changes within the equivalent range of the embodiments fall in the scope of the embodiments.

What is claimed is:

1. A wireless power receiving device having a metal body, comprising:
    a hole formed in one side of the metal body;
    a plastic film having a logo displayed on a surface thereof so as to be exposed outward through the hole;
    a receiving coil attached to a remaining surface of the plastic film;
    a first magnetism-shielding material attached to a surface of the receiving coil; and
    a second magnetism-shielding material formed on a bonding plane of the receiving coil and the metal body.

2. The device according to claim 1, wherein the receiving coil has a smaller planar area than a corresponding planar area of the hole.

3. The device according to claim 1, wherein the first magnetism-shielding material is attached, at one side thereof, to one side of the metal body so as to fix the receiving coil and the plastic film.

4. The device according to claim 1, further comprising a third magnetism-shielding material applied to a surface portion of the metal body around the hole.

5. The device according to claim 4, wherein an area, to which the third magnetism-shielding material is applied, is determined based on a shape and size of a transmitting coil, the transmitting coil being mounted in a wireless power transmitting device configured to supply power to the wireless power receiving device in a wireless manner.

6. The device according to claim 1, further comprising a third magnetism-shielding material applied to an entire surface of the metal body excluding the hole.

7. The device according to claim 6, wherein at least one of the first to third magnetism-shielding materials is any one of sintered Ni—Zn ferrite, half-sintered Mn—Zn ferrite, amorphous FeSiB ribbon, and Sendust-Si.

8. The device according to claim 6, wherein at least one of the first to third magnetism-shielding materials includes metal-based magnetic powder, which is formed of one element or a combination of two or more elements selected from among Fe, Ni, Co, Mo, Si, Al, and B, and a polymer composite.

9. The device according to claim 6, wherein at least one of the first to third magnetism-shielding materials includes ferrite-based powder, which is formed of a combination of two or more elements selected from among Fe, Ni, Mn, Zn, Co, Cu, and Ca, and a polymer composite.

10. The device according to claim 6, wherein at least one of the first to third magnetism-shielding materials is a ferrite-based sintered material formed of a combination of two or more elements selected from among Fe, Co, Ba, Sr, Zn, Ti, and Sn.

11. The device according to claim 6, wherein at least one of the first to third magnetism-shielding materials is permalloy.

12. The device according to claim 6, wherein, when the wireless power receiving device is a smart phone, the metal body is mounted to a portion of a rear surface of the smart phone, or an entire rear surface of the smart phone.

13. The device according to claim 1, wherein a planar area of the plastic film is greater than a planar area of the receiving coil and is equal to or less than a planar area of the hole.

14. The device according to claim 1, wherein a diameter and thickness of the receiving coil are set based on a diameter of the hole formed in the metal body.

15. The device according to claim 1, wherein a diameter of the hole formed in the metal body is set based on a diameter of a transmitting coil, the transmitting coil being mounted in a wireless power transmitting device configured to supply power to the wireless power receiving device in a wireless manner.

* * * * *